(12) United States Patent
Richard et al.

(10) Patent No.: US 11,402,805 B2
(45) Date of Patent: Aug. 2, 2022

(54) DEVICE AND METHOD FOR MEASURING HOROLOGICAL SHAKES

(71) Applicant: ETA SA Manufacture Horlogere Suisse, Grenchen (CH)

(72) Inventors: Murielle Richard, Sion (CH); Fabrice Ganguin, Moutier (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 142 days.

(21) Appl. No.: 17/030,559

(22) Filed: Sep. 24, 2020

(65) Prior Publication Data
US 2021/0173349 A1    Jun. 10, 2021

(30) Foreign Application Priority Data
Dec. 4, 2019   (EP) ..................................... 19213433

(51) Int. Cl.
*G04D 7/00*   (2006.01)
*G01L 3/24*   (2006.01)
(Continued)

(52) U.S. Cl.
CPC ............. *G04D 7/006* (2013.01); *G01B 9/00* (2013.01); *G01B 11/14* (2013.01); *G01L 3/24* (2013.01); *G04D 7/004* (2013.01)

(58) Field of Classification Search
CPC ........ G04D 7/006; G04D 7/001; G04D 7/004; G04D 7/005; G04D 7/008; G04D 7/009;
(Continued)

(56) References Cited

U.S. PATENT DOCUMENTS

| | | | | | |
|---|---|---|---|---|---|
| 3,383,983 | A | * | 5/1968 | Mamie | .................. G01B 11/14 356/615 |
| 2019/0146420 | A1 | * | 5/2019 | Piguet | .................. G04D 7/1264 73/1.46 |

FOREIGN PATENT DOCUMENTS

| | | |
|---|---|---|
| CH | 416 136 A | 6/1966 |
| CH | 712 940 A2 | 3/2018 |

(Continued)

OTHER PUBLICATIONS

Omega Qualified Watchmaker. (Aug. 16, 2019). Basic Watchmaking tips—checking and adjusting end shake. Omega Forums. Retrieved Apr. 5, 2022, from https://omegaforums.net/threads/basic-watchmaking-tips-checking-and-adjusting-end-shake.100219/ (Year: 2019).*

(Continued)

*Primary Examiner* — Daniel R Miller
*Assistant Examiner* — Eric Sebastian Von Wald
(74) *Attorney, Agent, or Firm* — Oblon, McClelland, Maier & Neustadt, L.L.P.

(57) ABSTRACT

A device for measuring horological shakes, including a structure carrying an articulated mechanism with a compliant mechanism having a linear force/stroke characteristic connecting a first fixed element to a second element capable of moving linearly under the effect of an actuator manoeuvring same in a contactless manner in both directions, and a position sensor determining the position of the second element in a direction, and a load sensor determining the variation in the axial pushing or pulling load of the second element carrying a gripper clamping a mobile component, and/or the variation in the gradient of this load, generating a signal for triggering the position measurement during each sudden change in gradient of the load in each direction of running, to determine the shake of the mobile component, by (Continued)

comparing the positions measured during the sudden changes in gradient during the outward and return strokes.

6 Claims, 3 Drawing Sheets

(51) Int. Cl.
  *G01B 9/00* (2006.01)
  *G01B 11/14* (2006.01)

(58) Field of Classification Search
  CPC .......... G04D 7/04; G04D 7/06; G04D 7/081; G04D 7/10; G04D 7/12; G04D 7/1221; G04D 7/1235; G04D 3/0087; G04D 3/0236; G04D 3/0245; G04D 3/045; G04D 37/0091; G01B 9/00; G01B 9/0201; G01B 9/02015; G01B 9/02019; G01B 9/02024; G01B 9/0203; G01B 11/14; G01B 11/16; G01B 11/161; G01L 3/24; B29L 2031/739; B23P 19/003
  See application file for complete search history.

(56) References Cited

FOREIGN PATENT DOCUMENTS

| CN | 1070492 A | 3/1993 | |
|---|---|---|---|
| CN | 205679922 U | 11/2016 | |
| CN | 107329393 A | 11/2017 | |
| JP | 59-142401 A | 8/1984 | |
| WO | WO-2019185298 A1 * | 10/2019 | ........... G01B 11/002 |

OTHER PUBLICATIONS

A. (Jan. 20, 2019). Simplifying The Art of Endshake in Watchmaking. No BS Watchmaker. Retrieved Apr. 5, 2022, from https://nobswatchmaker.com/blog/simplifying-the-art-of-endshake-in-watchmaking (Year: 2019).*
Combined Chinese Office Action and Search Report dated Nov. 8, 2021 in Patent Application No. 202011222511.X (with English translation of Category of Cited Documents), 6 pages.
European Search Report dated Mar. 27, 2020 in European Application 19213433.6 filed Dec. 4, 2019 (with English Translation of Categories of Cited Documents), 3 pages.

* cited by examiner

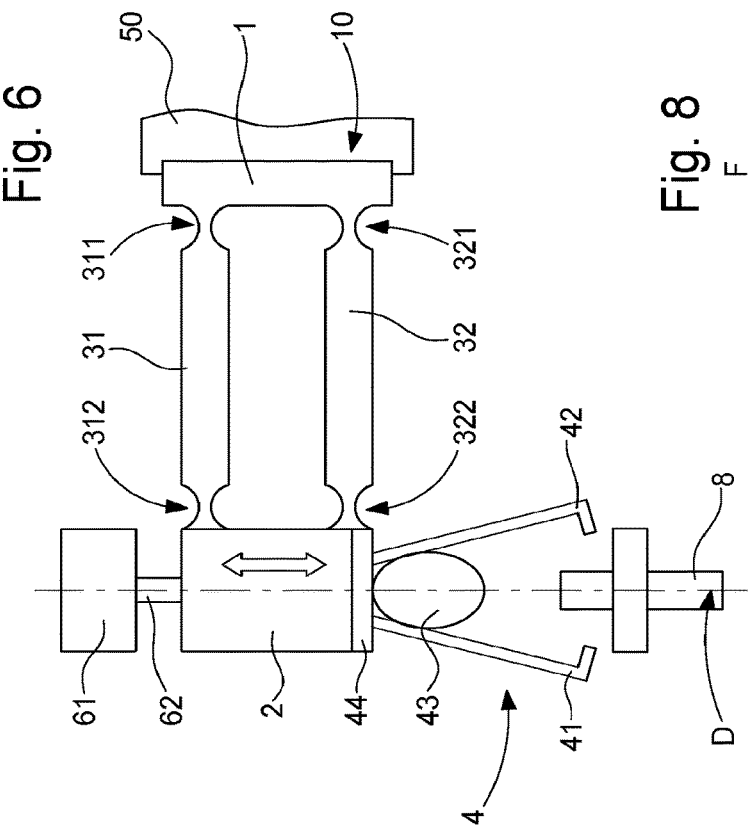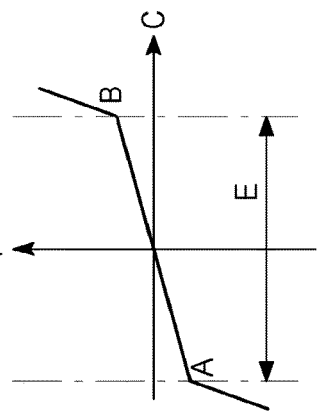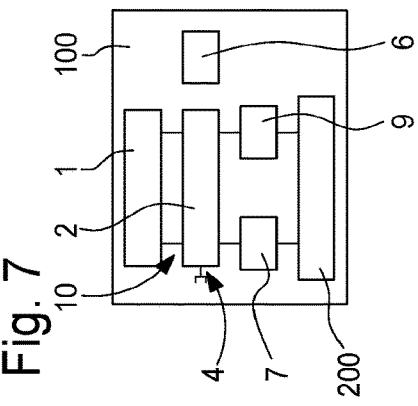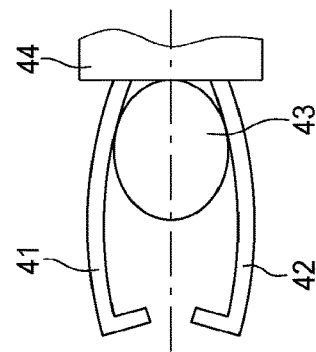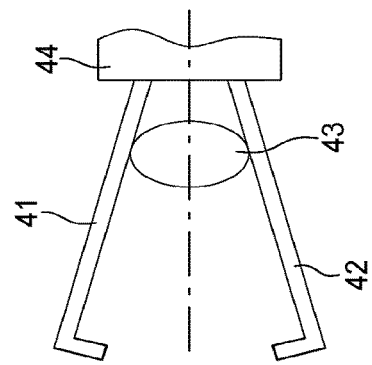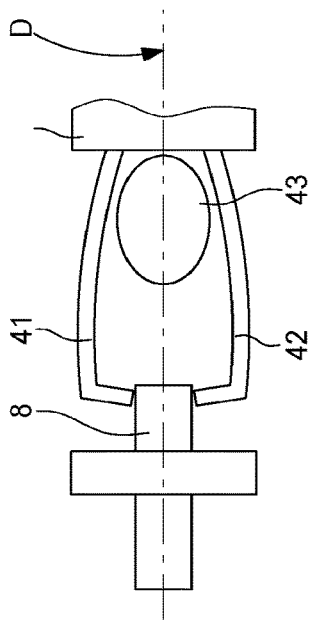

DEVICE AND METHOD FOR MEASURING HOROLOGICAL SHAKES

CROSS-REFERENCE TO RELATED APPLICATION

This application claims priority to European Patent Application No. 19213433.6 filed on Dec. 4, 2019, the entire disclosure of which is hereby incorporated herein by reference.

FIELD OF THE INVENTION

The invention relates to a device for measuring horological shakes, comprising a structure carrying an articulated mechanism comprising a clamp arranged so as to clamp a horological mobile component within a horological assembly or an assembled horological movement.

The invention relates to a method for measuring horological shakes, implementing this device.

The invention relates to the field of horological metrology, at the final assembly stage of the mechanism, and more particularly to measuring shakes in certain mobile components assembled in an assembly or in a horological movement.

BACKGROUND OF THE INVENTION

The measurement of the shake of a horological mobile component within an assembled mechanism, such as a horological movement, is a difficult and often inaccurate operation. This measurement is very difficult to carry out as a result of poor accessibility to the components of a horological mechanism, and it is dependent on the measurement conditions, and in particular on the position in the gravitational field. The measurement requires a displacement of the components, and can still be distorted by friction, micrometric shape and surface-finish defects, and by the nature of the lubrication.

A known principle consists in returning a whole mechanism to the gravitational field, and in measuring the positions and the strokes in two opposite top/bottom configurations, but this is difficult to implement.

The existing mechanisms require access to both sides of the mechanism to measure a shake, which is not always possible with certain mechanisms, in particular with integrated watches, or mechanisms having welded components, or similar mechanisms.

Moreover, with the appliances currently available, the pushing force exerted to carry out the measurement is applied according to experience, which does not guarantee that the measurement of the shake will not be distorted by a deformation, for example the deformation of a bridge, or a similar component;

SUMMARY OF THE INVENTION

The invention proposes implementing a measuring device and method which requires access to only one side of the horological mechanism.

The principle of a shake measurement based on compliant elements fulfils this condition.

The compliant system has the advantage of having a linear load/displacement characteristic, which allows the force and the displacement of the mobile component to be known simultaneously. It is thus possible to guarantee that only the shake is measured, and not the deformation of a bridge or other part of the movement or of the watch head.

The measurement according to the invention is also carried out in an innovative manner: the system pushes the mobile component in a measurement direction, in a first direction, for example downwards, until detecting the deformation of the movement, establishes its zero, and repeats this operation in reverse during an ascending movement until deformation in order to determine the shake.

Moreover, since the compliant system has no play and no friction, the guiding is guaranteed to not result in effects capable of disrupting/distorting the measurement.

The invention thus relates to a device for measuring horological shakes according to claim 1.

The invention further relates to a method for measuring shake, implementing this device.

BRIEF DESCRIPTION OF THE DRAWINGS

Other features and advantages of the invention will be better understood upon reading the following detailed description given with reference to the accompanying drawings, in which:

FIGS. 3 to 5 diagrammatically show a gripper constituted by a clamp with resilient arms, in an unloaded, free state in FIG. 3, in an open position under the effect of a cam in FIG. 4, and in the closed position, grasping a mobile component in FIG. 5;

FIG. 6 diagrammatically shows a part of the mechanism in FIG. 1, showing only the articulated mechanism comprising the compliant mechanism, the manoeuvring actuator, the gripper in the open position, and the mobile component to be checked;

FIG. 7 is a block diagram showing the data acquisition function modules;

FIG. 8 is a force/stroke diagram showing the two positions in which there is a sudden change in gradient of the load, which define the shake, between which the force characteristic is the linear characteristic of the compliant mechanism, and above which the absolute load value is greater than that of the load solely of the compliant mechanism and where the load gradient is variable and greater than the gradient of the characteristic of the compliant mechanism.

DETAILED DESCRIPTION OF THE PREFERRED EMBODIMENTS

Figure 1:
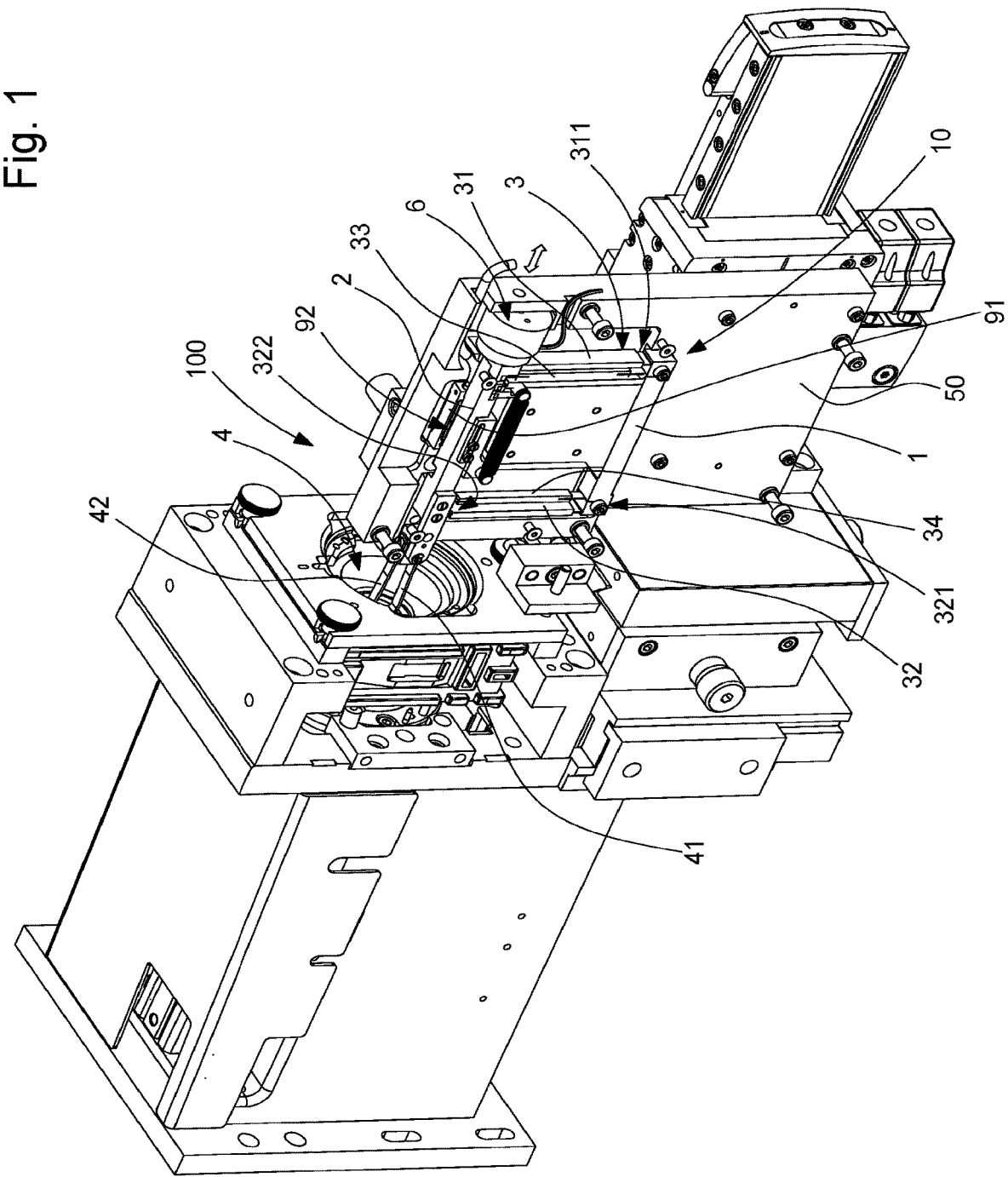
FIG. 1 diagrammatically shows a perspective view of a shake-measuring device according to the invention, which is a machine comprising a structure capable of positioning a horological movement or a horological assembly, and of procuring the access, in a measurement direction, and a gripper, in this case a clamp; this gripper is mounted at the end of a beam that is moved in a substantially linear manner by an actuator, this beam is suspended by a compliant mechanism relative to another element fixed to the structure, this compliant mechanism in this case comprising necked crosspieces forming a deformable parallelogram with the beam and the fixed element; the moving beam is provided with a contactless means for checking the linear position thereof, in this case an optical check.
Figure 2:
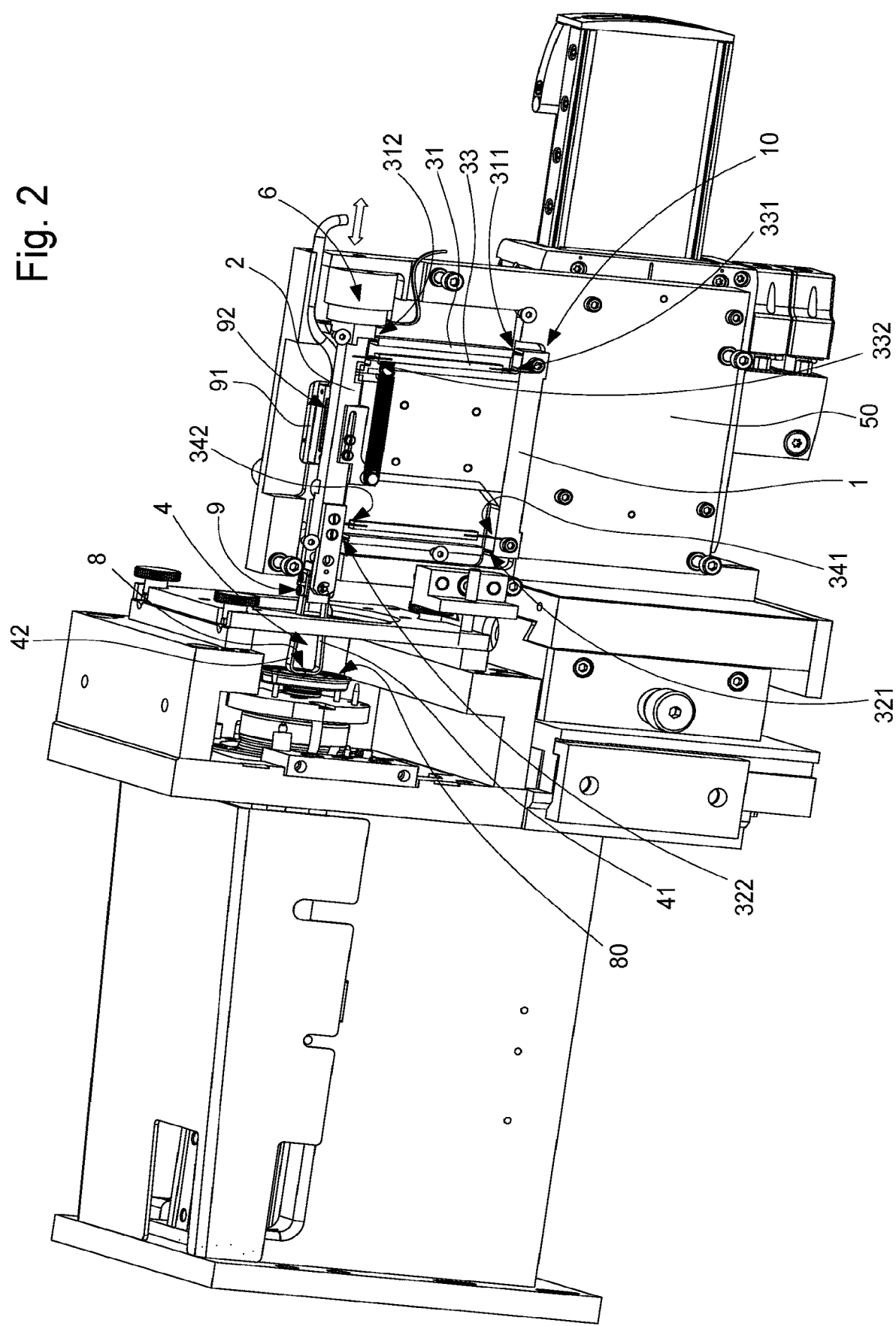
FIG. 2 shows, similarly to FIG. 1, the same mechanism from another angle, allowing the gripper to be viewed in the position in which it grasps the mobile component.

The invention relates to a device for measuring horological shakes 100. This device 100 comprises a structure 50, which carries an articulated mechanism 3 comprising a gripper 4 arranged so as to clamp a horological mobile component 8 within a horological assembly or an assembled horological movement. The term gripper is used in the broad sense: the figures show a mechanical gripper 4 which is a clamp, with arms 41 and 42 capable of clamping a shoulder of a mobile component 8, however this gripper can be of a different type, for example a vacuum gripper, a magnetic gripper, or of another type, while still remaining within the scope of the invention.

According to the invention, this articulated mechanism 3 comprises a first element 1 fixed to the structure 50, and relative to which a second element 2 is capable of undertaking a substantially linear movement under the effect of at least one actuator 6. This actuator 6 is arranged so as to manoeuvre, in a contactless manner and in both directions, the second element 2 substantially parallel to a measurement direction D. For example, the actuator 6 can comprise a coil generating the movement of a core, or a cylinder, or similar component; in this case, the term "motor" is used to describe the element generating a load, regardless of whether this load is mechanical, electrical, hydraulic, pneumatic, or otherwise.

The articulated mechanism 3 comprises a compliant mechanism 10 with necks and/or flexible strips, having a substantially linear force/stroke characteristic, connecting the second element 2 to the first element 1.

The device 100 comprises at least one position sensor 9, which is arranged to determine the position of the second element 2 in the measurement direction D.

The device 100 further comprises at least one load sensor 7, which is arranged to determine the variation in the axial pushing or pulling load of the second element 2 carrying the gripper 4, and/or the variation in the gradient of this load. This load sensor 7 is arranged to send, to a control system 200 comprised in the device 100, a signal for triggering the position measurement during each sudden change in gradient of the load in each direction of running, and to determine the value of the shake E of the mobile component 8 within the assembly in which it is mounted, by comparing the position values measured in the two positions in which a sudden change in gradient occurs during the outward stroke and the return stroke.

FIG. 8 shows the load/stroke diagram: between the positions A and B, a linear characteristic of a certain gradient qualifies the compliant mechanism; below the first position A and above the second position B, the load measured is, in absolute value form, significantly greater than the load specific to the compliant mechanism 10, and thus integrates the deformation of the structures carrying the mobile component 8: bridges, guides, or other structures. The device 100 thus serves to identity these two positions A and B: the shake E is quite simply the linear stroke between these two positions.

More particularly, the compliant mechanism 10 is of the four-necked system type with at least two crosspieces 31, 32, extending between the first element 1 and the second element 2, in particular substantially perpendicularly to one another, however not limited thereto, to which each of the crosspieces 31 and 32 are connected via two necks 311, 312, respectively 321, 322, the two crosspieces 31, 32, constituting, with the first element 1 and the second element 2, a deformable parallelogram in the specific and non-limiting example in the figures.

Specifically, this at least one position sensor 9 is an optical sensor with a measuring ruler 92 fixed to the compliant mechanism 10, at the second element 2, or fixed to the structure 50, and a reading head 91 is fixed to the structure 50, or respectively to the second element 2 of the compliant mechanism 10.

In particular, this at least one load sensor 7 is a power consumption sensor of the actuator 6. More specifically, the force/displacement characteristic of the compliant mechanism 10 is linear and known, and the force can be measured via the current injected into the motor. Provided that it is in the area with a shake, the force follows the characteristic of the compliant mechanism 10 and, after abutment, the current that must be injected into the motor of the actuator 6 to reach the next position will increase, and this power consumption gradient threshold of the motor can be easily detected.

The invention further relates to a method for measuring horological shakes. According to this method for measuring the shake of a mobile component 8 assembled in a mechanism in a measurement direction D, such a device 100 is implemented and the following steps are carried out:

the second element 2 is aligned in the measurement direction D;

the mobile component 8 is grasped using the gripper 4;

the actuator 6 is implemented in a first direction of running until a first sudden variation in the gradient of the load on the actuator 6 is recorded;

the first position in which this first variation occurs is recorded;

the actuator 6 is manoeuvred in a second direction of running opposite the first, until a second sudden variation in the gradient of the load on the actuator 6 is recorded;

the second position in which this second variation occurs is recorded;

and the value of the shake of the mobile component is calculated using the distance between the first position and the second position.

More particularly, in order to grasp the mobile component 8, the gripper 4 is selected in the form of a clamp, the gripper 4 is opened around a shoulder of the mobile component 8, and the gripper 4 is closed such that it clamps the mobile component 8.

The measurement of the shake of the mobile component is not the only possible application; the system can also be used for other distance or play measurements, requiring control of the force, for example the measurement of the shake of the balance of a mechanical movement, or even the measurement of the beat of an oscillating weight bearing, among many other possible applications.

In conclusion, the invention procures a reliable, inexpensive means for measuring shakes based on compliant elements, which guarantees excellent reproducibility of the measurements. The invention allows the shake of a mobile component to be measured with access from above the movement or from the watch head only.

The compliant system is inexpensive to produce and has a very long life without undergoing alterations to its characteristics.

The invention claimed is:

1. A device for measuring horological shakes comprising a structure carrying an articulated mechanism comprising a gripper arranged so as to clamp a horological mobile component within a horological assembly or an assembled horological movement, wherein said articulated mechanism comprises a first element fixed to said structure, and relative to which a second element is capable of undertaking a substantially linear movement under the effect of at least one actuator arranged so as to maneuver, in a contactless manner and in first and second running directions, said second element, in that said articulated mechanism comprises a compliant mechanism with necks and/or flexible strips, having a substantially linear force/stroke characteristic, connecting said second element to said first element, and wherein said device comprises at least one position sensor arranged to measure positions of said second element in said first and second running directions, and at least one load sensor arranged to determine variation in at least one of an axial pushing or pulling load of said second element carrying said gripper and a gradient of said load, and to send, to a control system comprised in said device, a signal for triggering a position measurement by the at least one position sensor during each sudden change in the variation in each of the first and second running directions, and to determine a value of a shake of said mobile component within the assembly in which it is mounted, by comparing position values measured in two positions in which the sudden change occurs.

2. The device according to claim 1, wherein said compliant mechanism is of a four-necked system type with at least two crosspieces, extending between said first element and said second element perpendicularly to one another, to which each of said crosspieces are connected via two necks, said two crosspieces constituting, with said first element and said second element, a deformable parallelogram.

3. The device according to claim 1, wherein said at least one load sensor is a power consumption sensor of said at least one actuator.

4. The device according to claim 1, wherein said at least one position sensor is an optical sensor with a measuring ruler fixed to said second element, or to said structure, and a reading head fixed to said structure, or respectively to said second element.

5. A method for measuring horological shakes, wherein for the measurement of the shake of a mobile component assembled in a mechanism, a device according to claim 1 is implemented, in that said second element is aligned with and maneuverable in said first and second running directions, in that said mobile component is grasped using said gripper, in that said at least one actuator is implemented in the first running direction until a first sudden change in the variation is recorded, in that a first position in which said first sudden change in the variation occurs is recorded, wherein said at least one actuator is maneuvered in the second running direction opposite the first running direction, until a second sudden change in the variation is recorded, in that a second position in which said second sudden change in the variation occurs is recorded, and in that a value of a shake of said mobile component is calculated using a distance between said first position and said second position.

6. The method according to claim 5, wherein in order to grasp said mobile component, said gripper is selected in the form of a clamp, in that said gripper is opened around a shoulder of said mobile component, and wherein said gripper is closed such that it clamps said mobile component.

\* \* \* \* \*